United States Patent [19]

Gruner et al.

[11] 4,283,944

[45] Aug. 18, 1981

[54] APPARATUS FOR MEASURING THE MASS OF A FLUID MEDIUM

[75] Inventors: Heiko Gruner, Gerlingen; Dieter Handtmann, Sindelfingen, both of Fed. Rep. of Germany

[73] Assignee: Robert Bosch GmbH, Stuttgart, Fed. Rep. of Germany

[21] Appl. No.: 104,937

[22] Filed: Dec. 18, 1979

[30] Foreign Application Priority Data

Feb. 3, 1979 [DE] Fed. Rep. of Germany ....... 2904154

[51] Int. Cl.$^3$ ................................................ G01F 1/68
[52] U.S. Cl. ...................................................... 73/204
[58] Field of Search ................. 73/204; 338/9, 25, 28, 338/308

[56] References Cited

U.S. PATENT DOCUMENTS

| | | | |
|---|---|---|---|
| 4,213,335 | 6/1980 | Peter et al. | 73/204 |
| 4,214,478 | 7/1980 | Lauterbach | 73/204 |

Primary Examiner—Herbert Goldstein
Attorney, Agent, or Firm—Edwin E. Greigg

[57] ABSTRACT

An apparatus is proposed for measuring the mass of a fluid medium such as the mass of air induced by internal combustion engines which has at least one temperature-dependent measuring resistor film disposed in the flow of the medium, whose temperature and/or resistance is regulated in accordance with the mass of the medium and wherein the manipulated variable is a measure for the mass of the medium. The temperature-dependent measuring resistor film is disposed on a carrier separated therefrom by an insulating film and a temperature-dependent heating resistor film. The temperature of the heating resistor film is regulated to approximately the same temperature as the temperature-dependent measuring resistor film so that a heat flow between the temperature-dependent measuring resistor and the carrier is prevented. As a result, the response speed of the apparatus to changes in the flow rate of the medium is substantially improved as is the precision of measurement.

6 Claims, 3 Drawing Figures

APPARATUS FOR MEASURING THE MASS OF A FLUID MEDIUM

BACKGROUND OF THE INVENTION

The invention relates to an apparatus for the measurement of the mass flow of a fluid medium. An apparatus of this kind has already been proposed, but in which it is disadvantageous that the carrier for the temperature-dependent measurement resistor, because of its not-insignificant mass, has a certain heat capacity. The heat flow between the temperature-dependent resistor and the carrier causes a reduction in the response speed of the temperature-dependent resistor when the flowing mass is changing.

OBJECT AND SUMMARY OF THE INVENTION

The apparatus in accordance with the invention has the advantage over the prior art in that no heat flow takes place any longer between the temperature-dependent resistor and the carrier when the flowing mass is changing. As a result, the apparatus has a very fast response speed to changes in the mass of the flowing medium, and the measurement precision is increased.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
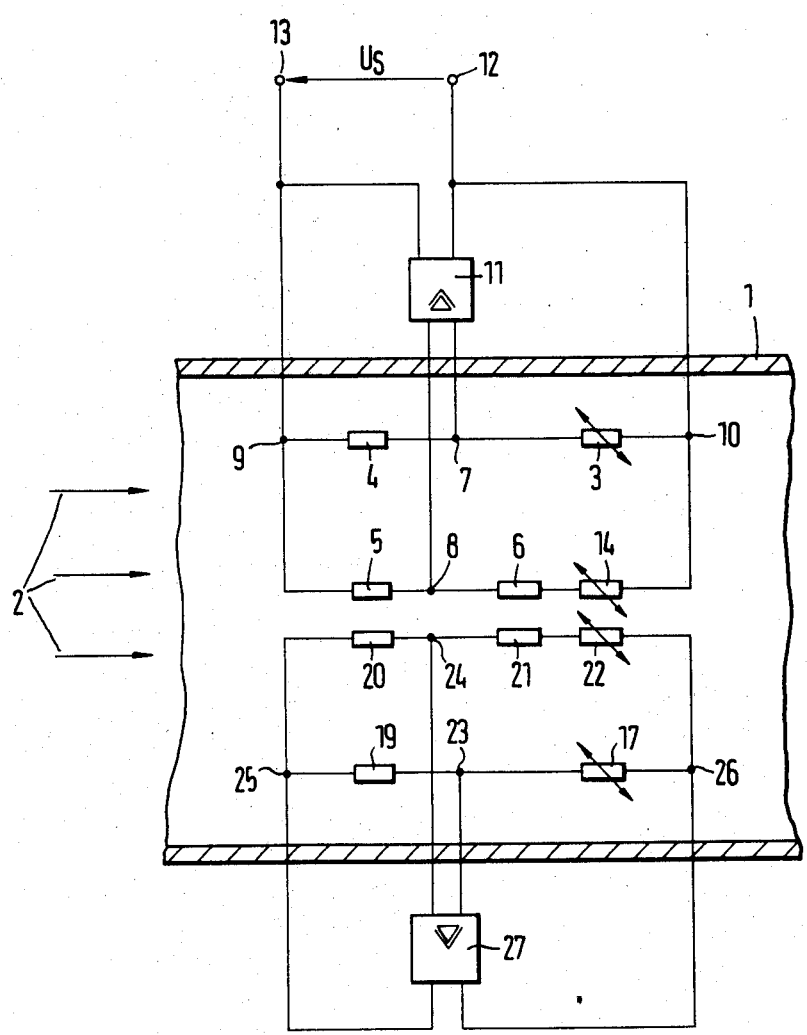
FIG. 1 is a circuit diagram for an apparatus for measurement of the mass of a flowing medium having at least one temperature-dependent resistor.

The fluid mass measurement apparatus of the invention is used, as an example, for the measurement of a quantity of air aspirated by an internal combustion engine. Referring now to FIG. 1, there is shown an induction tube 1 incorporated in the intake manifold of an internal combustion engine (not shown) through which air flows in the direction of the arrows 2. The induction tube 1 includes a temperature-dependent resistor 3, in the form of a hot film which carries an electrical current of a controlled magnitude and which supplies the actual value signal for the controller.

The controller holds the temperature of the resistor 3 at a level somewhat above the average air temperature. If the air flow rate, i.e., the velocity of the flowing air, increases, the temperature of the resistor 3 tends to drop. This drop in temperature results in a change of resistance and hence a change in the voltage drop across the resistor which is sensed at the input of the controller, which thereby changes its output current until the predetermined temperature of the resistor 3 is again attained. Thus the controller, embodied schematically by a differential amplifier 11, continuously attempts to hold the temperature of the resistor 3 at a constant temperature in spite of fluctuations in the air flow rate, so that its output current at the same time may be used in a regulating device to show the prevailing air flow rate.

The measuring resistor 3, which is temperature-dependent, may be connected in series with a fixed resistor 4 in a first arm of a measuring bridge whichd has a second arm consisting of series connected resistors 5 and 6. The two arms of the bridge are connected in parallel at junctions 9 and 10. At the point 8, a reference voltage is applied to one input of a differential amplifier 11 while the voltage at the point 7 between the measuring resistor 3 and the resistor 4 is applied to the second input of the differential amplifier 11. The points 9 and 10 are connected across the outputs of the differential amplifier 11 and are thus supplied with operating current.

The output voltage of the differential amplifier 11, designated $U_S$, may be used externally at contacts 12 and 13 for purposes of providing an input signal to fuel management systems and the like. In particular, the signal $U_S$ may be used to control the amount of fuel supplied to the engine for the prevailing air flow rate in a known but not illustrated fuel metering system.

The current flowing through the temperature-dependent resistor 3 heats this resistor until the input voltage to the differential amplifier 11 equals the voltage at the other input or some different, predetermined voltage. The output of the amplifier 11 is thus a controlled current flowing into the measuring bridge circuit. If the air flow rate changes, the temperature of the resistor 3 also changes, as does its resistance, which causes a change in the voltage difference between the points 7 and 8, causing the amplifier 11 to correct the output current supplied to the points 9 and 10 until such time as the measuring bridge is balanced or has reached a predetermined degree of imbalance. Accordingly, the output voltage $U_S$, as well as the current through the resistor 3, or the voltage drop in the temperature-dependent resistor 3 or in another resistor of the measuring bridge circuit 3, 4, 5, 6, 14, constitutes a measure for the prevailing air flow rate.

In order to compensate for the influence of the temperature of the aspirated air on the measured result, it may be suitable to supply a second temperature-dependent compensating resistor 14 in the second arm of the bridge. The magnitude of the resistances of the resistors 5, 6 and 14 should be so chosen that the power loss due to the current flowing through the second temperature-dependent resistor 14 is so low that its temperature is unaffected by changes of the bridge voltage but always corresponds substantially to the temperature of the air flowing around it.

Figure 2:
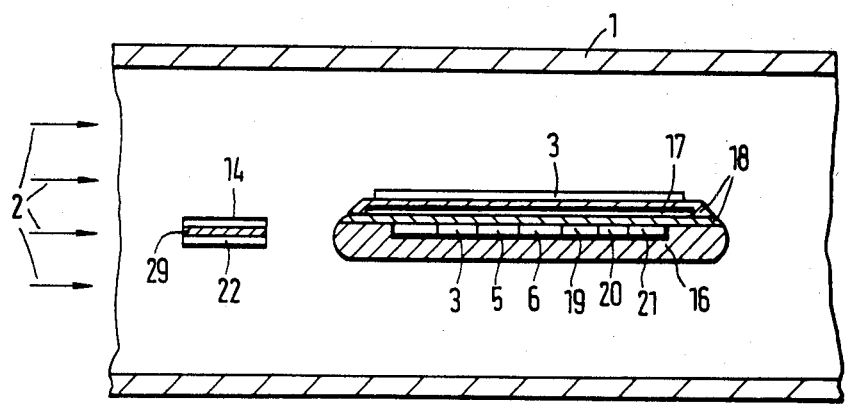
FIG. 2 is a longitudinal sectional view of one embodiment of the apparatus of the invention for measurement of the mass of a flowing medium.
Figure 3:
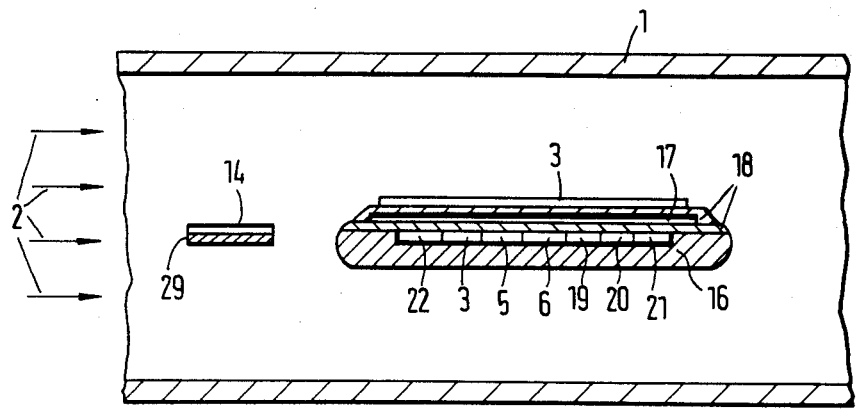
FIG. 3 is a longitudinal sectional view of a further embodiment of the apparatus of the invention for measurement of the mass of a flowing medium.

As is shown in FIGS. 2 and 3, the temperature-dependent measuring resistor 3, formed as a film and applied to a carrier 16 in accordance with a known method, can partially cover the carrier. However, it can also surround the carrier 16 entirely. Thus, in accordance with the invention, a temperature-dependent heating resistor 17 is disposed between the temperature-dependent measuring resistor 3 and the carrier 16. The heating resistor 17 is also formed as a film and is electrically insulated relative to both the measuring resistor 3 and the carrier 16 by an insulating film 18, such as an $Al_2O_3$ film applied in the same precipitation cycle as the temperature-dependent measuring resistor 3 and the temperature-dependent heating resistor 17. The heating resistor 17 should have a surface area facing the measuring resistor 3 which is at least large enough that a heat flow between the measuring resistor 3 and the carrier 16 is prevented.

The temperature-dependent heating resistor 17 is part of a separate heating bridge circuit, unconnected to the measuring bridge circuit but corresponding to it in design. Thus the heating resistor 17 and a resistor 19 together make up a first arm of a bridge circuit, which has a second arm consisting of series connected fixed resistors 20 and 21 and a temperature-dependent compensating resistor 22. The pickup point 23 is located between the resistors 17 and 19, and the pickup point 24 is located between the resistors 20 and 21. The two arms of the heating bridge are connected in parallel at junctions 25 and 26.

The diagonal voltage appearing between points 23 and 24 of the heating bridge 17, 19, 20, 21, 22 is applied to the input of an amplifier 27, to the output terminals of which the points 25 and 26 of the heating bridge are connected, so that its output voltage supplies the heating bridge circuit with operating voltage or operating current. The heating bridge circuit 17, 19, 20, 21, 22 is so designed that the temperature-dependent heating resistor 17 is heated by the current flowing through it in such a manner that it virtually always has the same temperature as does the temperature-dependent resistor 3. By balancing the resistors 6 or 21, the temperature coefficient in the bridge arms 6, 14 or 21, 22 can be set to be such that a desired course for the excess temperature of the measuring or heating resistor 3 or 17 over the air temperature can be set as a function of the air temperature.

By underlaying the temperature-dependent measuring resistor film 3 with the temperature-dependent heating resistor film 17, regulated to the same temperature as that of the resistor 3, a heat flow between the measuring resistor 3 and the carrier 16 is suppressed, so that the response speed of the temperature-dependent resistor 3 to changes in the flow rate within the flow cross section 1 is increased substantially, as is the degree of measurement precision.

In an advantageous manner, the temperature-dependent resistors 3, 14, 17 and 22 are made of the same material and have the same high temperature coefficients of the electrical resistor. The other resistors 4, 5, 6, 19, 20 and 21 of the measuring and heating bridge circuits should have a low temperature coefficient. In the exemplary embodiment of FIG. 2, the temperature-dependent compensating resistors 14 and 22 are applied to a carrier material 29 which is disposed upstream of the carrier 16 in the induction tube 1. The other resistors 4, 5, 6, 19, 20, and 21 are disposed advantageously on the carrier 16 and, in particular, between the temperature-dependent heating resistor 17 and the carrier 16.

In the exemplary embodiment of FIG. 3, the compensating resistor 22 of the heating bridge circuit is no longer disposed on the carrier material 29 in the air flow, but rather also on the carrier 16, and in particular between the carrier 16 and the temperature-dependent heating resistor 17, like the other resistors 4, 5, 6, 19, 20, 21. As a result, one less electrical connection is required on the carrier material 29.

The foregoing relates to preferred exemplary embodiments of the invention, it being understood that other embodiments and variants thereof are possible within the spirit and scope of the invention, the latter being defined by the appended claims.

What is claimed and desired to be secured by letters patent of the United States is:

1. An apparatus for measuring the mass of a fluid medium such as the mass of air induced in internal combustion engines comprising, in combination, a measuring bridge circuit, a carrier, at least one temperature-dependent measuring resistor connected in said measuring bridge circuit and disposed in the flow of said medium, said at least one temperature-dependent measuring resistor applied as a film to said carrier, the temperature and/or resistance of said resister being regulated in accordance with the flowing mass to provide a manipulated variable as a measure for the mass of the fluid medium, a temperature-dependent heating resistor applied as a film to said carrier between the temperature-dependent measuring resistor and the carrier in electrically insulated relationship with said temperature-dependent measuring resistor, a heating bridge circuit including said temperature-dependent heating resistor wherein said temperature-dependent heating resistor is regulated to approximately the same temperature as said temperature-dependent measuring resistor.

2. An apparatus in accordance with claim 1, including a temperature-dependent compensating resistor disposed in each of said measuring bridge circuit and said heating bridge circuit.

3. An apparatus in accordance with claim 2, wherein said at least one temperature-dependent measuring resistor, said temperature-dependent heating resistor and said temperature dependent compensating resistors have equally high temperature coefficients.

4. An apparatus in accordance with claim 2, wherein said compensating resistors are disposed in the flow of said medium upstream of said carrier.

5. An apparatus in accordance with claim 4, including further resistors having low temperature coefficients are disposed on said carrier in said measuring bridge circuit and in said heating bridge circuit together with said temperature-dependent compensating resistors between said temperature-dependent heating resistor and said carrier.

6. An apparatus in accordance with claim 5 wherein only one of the compensating resistors in one of said measuring bridge circuit and said heating bridge circuit is disposed in the flow of the medium upstream of said carrier, the other of said compensating resistors and said further resistors having low temperature coefficients of said measuring bridge circuit and of said heating bridge circuit are disposed on said carrier between said temperature-dependent heating resistor and said carrier.

* * * * *